(12) United States Patent
Uzee et al.

(10) Patent No.: US 8,173,740 B2
(45) Date of Patent: May 8, 2012

(54) STYRENE TETRABLOCK COPOLYMERS AND POLYMER BLEND COMPOSITIONS BASED UPON SUCH COPOLYMERS

(75) Inventors: Andre J. Uzee, Baton Rouge, LA (US); Michael O. Myers, Baton Rouge, LA (US)

(73) Assignee: TSRC (USA) Investment Corporation, Country of New Castle, Wilmington, DE (US)

(*) Notice: Subject to any disclaimer, the term of this patent is extended or adjusted under 35 U.S.C. 154(b) by 304 days.

(21) Appl. No.: 12/514,744

(22) PCT Filed: Oct. 24, 2007

(86) PCT No.: PCT/US2007/082389
§ 371 (c)(1),
(2), (4) Date: May 13, 2009

(87) PCT Pub. No.: WO2008/063807
PCT Pub. Date: May 29, 2008

(65) Prior Publication Data
US 2010/0056697 A1   Mar. 4, 2010

Related U.S. Application Data

(60) Provisional application No. 60/860,245, filed on Nov. 20, 2006.

(51) Int. Cl.
*C08L 53/00* (2006.01)
(52) U.S. Cl. ............ 524/505; 525/98; 525/99; 525/240; 525/241
(58) Field of Classification Search .................. 524/505; 525/98, 99, 240, 241
See application file for complete search history.

(56) References Cited

U.S. PATENT DOCUMENTS

| | | |
|---|---|---|
| 3,595,942 A | 7/1971 | Wald et al. |
| 3,753,936 A | 8/1973 | Marrs et al. |
| 4,572,819 A | 2/1986 | Priddy et al. |
| 4,585,825 A | 4/1986 | Wesselmann |
| 4,666,987 A | 5/1987 | Burmester et al. |
| 4,789,699 A | 12/1988 | Kieffer et al. |
| 4,970,259 A | 11/1990 | Mitchell et al. |
| 4,977,014 A | 12/1990 | Mitchell et al. |
| 5,134,968 A | 8/1992 | Yancy |
| 5,242,984 A | 9/1993 | Dillman et al. |
| 5,721,320 A | 2/1998 | Priddy et al. |
| 6,410,129 B2 | 6/2002 | Zhang et al. |
| 6,984,688 B2 * | 1/2006 | Gu ................... 524/476 |
| 2003/0191241 A1 | 10/2003 | Fujiwara et al. |
| 2005/0256265 A1 | 11/2005 | Wright et al. |
| 2006/0151901 A1 | 7/2006 | Leffelaar et al. |
| 2006/0155044 A1 | 7/2006 | Joly et al. |
| 2006/0205874 A1 | 9/2006 | Uzee et al. |

FOREIGN PATENT DOCUMENTS

| | | | |
|---|---|---|---|
| EP | 793690 | | 9/1997 |
| EP | 1426411 | | 6/2004 |
| EP | 1674489 | | 6/2006 |
| JP | P339172 | | 10/2002 |
| WO | WO 01/04208 | * | 1/2001 |
| WO | WO-02/00806 | | 1/2002 |
| WO | WO-2004/104095 | | 12/2004 |
| WO | WO-2005/050427 | | 6/2005 |
| WO | WO-2006/036301 | | 4/2006 |

OTHER PUBLICATIONS

Yau et al., *Modern Size-Exclusion Chromatography*, ISBN-0-471-03387-1, John Wiley and Sons, New York, pp. 404-412 (1979).
Runyon et al., *Journal of Applied Polymer Science*, vol. 13, pp. 2359-2369 (1969).
Tung et al., *Journal of Applied Polymer Science*, vol. 24, pp. 953-963 (1979).

* cited by examiner

*Primary Examiner* — Robert D. Harlan
(74) *Attorney, Agent, or Firm* — Snell & Wilmer L.L.P.

(57) ABSTRACT

A composition of matter that may be used to make transparent, substantially gel-free polymeric films includes at least a styrenic block copolymer and a thermoplastic resin other than the styrenic block copolymer. The styrenic block copolymer (e.g. S-I-B-S) has four distinct and sequential blocks: a first styrenic block (S), a first diene block (e.g. isoprene or I), a second diene block that differs from the first diene block (e.g. butadiene or B) and a second styrenic block (S). The styrenic block copolymer desirably lacks any random diene block (e.g. a random isoprene/butadiene block). The styrenic block copolymer also desirably lacks any significant percentage of a triblock copolymer (S-I-B). The composition of matter may also include an extender material such as white mineral oil. The compositions may be used to make mono-layer or multi-layer cast or blown films.

15 Claims, No Drawings

STYRENE TETRABLOCK COPOLYMERS AND POLYMER BLEND COMPOSITIONS BASED UPON SUCH COPOLYMERS

The present invention relates generally to a novel styrenic block copolymer (SBC) that contains a midsection comprising polymerized blocks of at least two different diene monomers, especially butadiene (B) and isoprene (I). With styrene (S) as a styrenic monomer and both butadiene and isoprene as diene monomers, one may refer to the SBC as a S-I-B-S block copolymer. The present invention also relates to polymer blend compositions, particularly polymer blend compositions that contain a major (more than 50 percent by weight (wt percent), based upon blend weight, amount of the novel SBC. The present invention further relates to polymeric films and sheets formed from the novel SBC or the polymer blend compositions. As used herein, a "sheet" has a thickness of 20 mils (0.51 mm) or more and a "film" has a thickness of less than 20 mils (0.51 mm).

United States Patent Application Publication (USPAP) 2006/0155044 (Joly et al.) discloses a composition of matter suitable for use in manufacturing a polymeric film. The composition comprises (a) at least 65 wt percent of a SBC, (b) from 5 wt percent to 25 wt percent of a second thermoplastic resin and (c) from 1 wt percent to 10 wt percent of a plasticizing oil, each wt percent being based upon composition weight and, when taken together, total 100 wt percent. The SBC must contain a substantially random I/B polymer midblock that has an I/B ratio within a range of from 30/70 to 70/30 and have a glass transition temperature (Tg) of no more than −60 degrees centigrade (° C.), preferably −85° C. to −75° C. The SBC has S content within a range of from 28 wt percent to 31 wt percent, based upon SBC weight, and an apparent molecular weight within a range of from 110,000 to 160,000. Joly et al. recognizes that SBC preparation via coupling of living diblock segments may leave some living S-I/B diblock segments in an uncoupled state, with "some" preferably being no more than 20 mole percent (mol percent), based upon total moles of SBC. The second thermoplastic resin may be a polyolefin, a polystyrene resin, a coumarone-indene resin, a polyindene resin, a poly(methylindene) resin, an alpha-methylstyrene resin, a polyphenylene resin or a mixture of such resins or copolymers of styrene and a compatible monomer such as alpha-methylstyrene, methylstyrene or vinyl toluene. Polyolefins include polyethylene, polypropylene, ethylene/propylene copolymers and interpolymers of ethylene, propylene and a third monomer, for example, a diene monomer as in EPDM.

European Patent Application (EP) 1,674,489 (Trommelen et al.) provide block copolymer compositions comprising a) a tetrablock copolymer represented by a formula $S_1$-$D_1$-$D_2$-$S_2$, where $S_1$ and $S_2$ represent the same or different predominantly styrene polymer blocks and $D_1$ and $D_2$ represent different polymer blocks derived from at least one predominantly conjugated diene, and b) a diblock copolymer of formula $S_1$-$D_1$ or $S_2$-$D_2$. Paragraph [0029] specifies that preferred block copolymer compositions include those wherein $D_1$ and $D_2$ blocks have been derived, respectively, from substantially pure butadiene and substantially pure isoprene. Paragraph [0030] allows either $D_1$ or $D_2$ to be a block derived from a mixture of conjugated dienes, either in a random fashion or in a tapered fashion. Paragraph [0037] clearly teaches preparation of a random diene polymer block, possibly followed by a pure isoprene block. The last row of Table 1 includes four examples of what appear to be non-random S-(I/B)-I-S tetrablock copolymers in admixture with a defined quantity (13.9 percent in polymer 3 to 27.3 percent in polymer 1) of S-I diblock copolymer.

U.S. Pat. No. 3,595,942 (Wald et al.) disclose partially hydrogenated block copolymers. The block copolymers conform to a formula A-(B-A)$_{1-5}$, wherein A is a monovinyl arene polymer block and each B is a conjugated diene polymer block. In a block copolymer represented by formula A-B-(B-A)$_{1-5}$, adjacent B blocks constitute a single polymer block. At column 3, lines 5-8, Wald et al. note that B blocks may be random copolymers of, for example, styrene and butadiene, substantially homopolymeric, somewhat branched conjugated diene blocks find favor.

USPAP 2006/0205874 (Uzee et al.) teaches blends of elastomeric and thermoplastic monovinylidene aromatic-conjugated diene block copolymers that form transparent elastomeric products. The blends include a) from 65 parts by weight (pbw) to 92 pbw of an elastomeric monovinylidene aromatic-conjugated diene block copolymer that has a monovinylidene aromatic content of less than 50 wt percent, based upon total copolymer weight, b) from 8 pbw to 35 pbw of a thermoplastic monovinylidene aromatic-conjugated diene block copolymer that has a monovinylidene aromatic content of at least 50 wt percent, based upon total copolymer weight, and c) from 0 pbw to 30 pbw of an extender oil. The amounts of a), b) and c) are based upon blend weight and total 100 pbw. Illustrative SBCs include SB, SBS, SI, SIS, SISIS, SBSBS, and SISBS copolymers.

U.S. Pat. No. 3,753,936 (Marrs) focuses upon branched rubbery block copolymer adhesive compositions. Marrs notes, at column 4, lines 13-19, that elastomeric block portions of such block copolymers may be a homopolymer of a conjugated diene, a copolymer of two or more conjugated dienes, or a copolymer of one or more monovinyl-substituted aromatic hydrocarbons. Marrs includes several examples, but each example shows only one conjugated diene in any block copolymer.

USPAP 2006/0151901 (Leffelaar et al.) describes use of a SISI' tetrablock copolymer in a packaging tape adhesive composition. I and I' represent poly(isoprene) blocks of the same or different molecular weight.

USPAP 2003/0191241 (Fujiwara et al.) discusses compositions comprising from 2 pbw to 40 pbw, based on composition weight, of a block copolymer that includes at least one copolymer block comprising isoprene and 1,3-butadiene and/or at least one block comprising isoprene, 1,3-butadiene and a vinyl aromatic hydrocarbon and from 98 pbw to 60 pbw of at least one thermoplastic resin selected from styrene resins, polyolefin resins, and poly(phenylene ether) resins or an asphalt. The block copolymer has a vinyl aromatic hydrocarbon content of from 5 wt percent to less than 60 wt percent, based upon block copolymer weight. The isoprene/1,3-butadiene block has a weight ratio of I:B within a range of from 95/5 to 5/95. Paragraph [0036] appears to specify that the isoprene/1,3-butadiene block be a random copolymer.

Patent Cooperation Treaty (PCT) Application WO 2006/036301 (Toney et al.) disclose asymmetric, tapered linear block copolymers of an alkenyl arene and a conjugated diene as well as blends of such copolymers with alkenyl arene polymers and copolymers. The block copolymers contain a mid-block of polymerized conjugated diene (for example, B, I or both B and I).

A first aspect of the present invention is a polymer blend composition, preferably a film-forming polymer blend composition, the composition comprising components:

a) from 55 percent by weight, preferably from 65 percent by weight, to 92 percent by weight, based upon composition weight, of a styrenic tetrablock copolymer, the tetrablock copolymer having (1) a molecular structure represented as S-I-B-S, wherein each S is independently a polymer block of predominantly styrene and has an apparent molecular weight within a range of from 10,000 to 15,000, I is a polymer block of predominantly isoprene and B is a polymer block of predominantly butadiene, I and B being present in a weight ratio of I:B that falls within a range of from 75:25 to 15:85, (2) a polymerized styrene content within a range of from 18 percent by weight to 32 percent by weight, based upon tetrablock copolymer weight, and (3) an apparent molecular weight within a range of from 100,000 to 160,000;

b) from 8 percent by weight to 45 percent by weight, preferably to 30 percent by weight, based upon composition weight, of a thermoplastic resin that differs from component (a); and, optionally, c) from 0 percent by weight to 20 percent by weight, preferably to 10 percent by weight, based upon composition weight, of an extender material, amounts of a), b) and c), when taken together, totaling 100 percent by weight.

Part a) of the composition of the first aspect may include an amount of linear triblock (S-I-B) copolymer without substantially degrading hysteresis performance of the composition. The amount, when present, suitably ranges from greater than zero (0) percent by weight (wt percent) to no more than 15 wt percent, preferably to no more than 10 wt percent and even more preferably to no more than 2 wt percent, in each case based upon total composition weight.

The composition of the first aspect preferably forms a polymeric mono-layer film or at least one layer of a multi-layer film, which films constitute a second aspect of the present invention. The composition used to make the polymeric film preferably has an improved balance of peak force, unload force, set percent and relaxation when compared to films made with polymers incorporating random diene blocks.

In an aspect related to the second aspect, the present invention also comprises a fiber, a mesh or netting or a non-woven article (for example, fabric) prepared from the composition of the first aspect noted above. A fiber may have a single component, in which case the composition of the first aspect comprises substantially all, preferably all, of a fibers polymeric content. Alternatively, the composition of the first aspect may comprise one of at least two components of a multi-component fiber.

As used throughout this specification, definitions presented in succeeding paragraphs or elsewhere in the specification, have meanings ascribed to them where first defined.

References to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups.

Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

When ranges are stated herein, for example, from 2 to 10, both end points of the range (2 and 10) are included within the range unless otherwise specifically excluded.

Expressions of temperature may be in terms either of degrees Fahrenheit (° F.) together with its equivalent in degrees centigrade (° C.) or, more typically, simply in degrees centigrade (° C.).

Expressions of molecular weight refer to "corrected weight average molecular weights" ($M_w$). Determine Mw by size exclusion chromatography (SEC) using commercially available polystyrene calibration standards, HPLC (High Performance Liquid Chromatography) grade tetrahydrofuran (THF) flowing at a rate of 1 milliliter per minute (ml/min) as a carrier solvent, an Agilent Model 1100 series liquid chromatograph with a G1362A refractive index detector, a G1314A variable wavelength detector, four 300 millimeter (mm) by 7.5 mm Polymer Laboratories PLGel™ SEC columns packed with five micrometer (μm) particles, one Mixed-C, two 105 angstrom (Å) ($1\times10$-5 meter (m)), and one $10^4$ Å ($1\times10^{-6}$ m), and molecular weight corrections as taught by Runyon et al., *Journal of Applied Polymer Science*, Volume 13, pages 2359-2369 (1969) and Tung, L. H., *Journal of Applied Polymer Science*, Volume 24, pages 953-963 (1979). Column and detectors operate at a set point temperature of 40° C. with a run time of 45 minutes. Mw values, often stated as dimensionless numbers, may alternatively be specified in terms of Daltons, with Daltons being equivalent to grams per mole (g/M).

The determination of weight percent styrene in a tetrablock copolymer is based upon a ratio of signals from a refractive index detector to signals from a variable wavelength detector set at 254 nanometers (nm), gathered during SEC analysis in accord with teachings of Runyon et. al. noted above as well as those of Yau et al., *Modern Size-Exclusion Chromatograhy*, ISBN-0-471-03387-1, John Wiley and Sons, New York, pages 404-412 (1979).

Some physical property data presented herein follows procedures outlined in various American Society for Testing and Materials (ASTM) standards. Where appropriate, a particular ASTM standard is linked to physical property data.

"Elastic" and "elastomeric", as used herein, refer to a material that, when elongated or deformed under an externally applied force, substantially resumes its original dimension or shape, upon release of the externally applied force. In this context, "substantially" means no more than 20 percent (percent), preferably no more than 15 percent and more preferably no more than 10 percent, of essentially permanent deformation or elongation. As an extension, "elastomer" refers to any material that exhibits elastic or elastomeric properties.

Compositions of the present invention comprise, in part, at least 55 wt percent, preferably from 55 wt percent to 92 wt percent, more preferably from 65 wt percent to 90 wt percent and still more preferably from 70 wt percent to 85 wt percent, in each case based upon total composition weight, of a styrenic tetrablock copolymer. Each tetrablock copolymer comprises an elastomeric soft portion that separates two thermoplastic hard blocks, nominally S. The elastomeric soft portion comprises, in turn, distinct and sequential blocks of two different diene monomers, especially B and I. Such tetrablock copolymers may be represented molecularly and structurally represented as S-I-B-S or as S-B-1-S if one reverses order of diene monomer addition. Each S is independently a predominantly styrene polymer block with a peak weight average molecular weight of at least (≧) 9,500 g/M, more preferably ≧9,800 g/M, most preferably ≧10,000 g/M and preferably less than or equal to (≦) 35,000 g/M, more preferably ≦20,000 g/M and still more preferably ≦15,000 g/M, with a range of from 10,000 g/M to 15,000 g/M being especially preferred. Tetrablock copolymers with substantially equal S block $M_w$ values typically bear a label of "symmetric" while a label of "asymmetric" refers to those tetrablock copolymers with unequal S block $M_w$ values. I and B represent, respectively, predominantly isoprene polymer blocks and predominantly butadiene polymer blocks. In other words, an I block contains very little, preferably no, monomer other than isoprene and a B block contains very little, preferably no, monomer other than butadiene. On that basis, the tetrablock copolymer contains very little, preferably no, random I/B copolymer. I and B relate to each other via a weight ratio of I to B that falls within a range of from 75:25 to 15:85, preferably within a range of from 65:35 to 20:80, still more preferably within a range of from 50:50 to 25:75, and most preferably within a range of from 40:60 to 25:75. Each diene block has a molecular weight of ≧20,000 g/M, more preferably ≧25,000 g/M, still more preferably ≧30,000 g/M and preferably ≦400,000 g/M, more preferably ≦200,000 g/M and still more preferably ≦150,000 g/M. The styrenic tetrablock has an overall Mw within a range of from 50,000 g/M to 400,000 g/M, more preferably from 85,000 g/M to 160,000 g/M, and a polymerized styrene content less than 50 wt percent, preferably less than 40 wt percent, more preferably less than 35 wt percent and still more preferably within a range of from 15 wt percent to 32 wt percent, in each case based upon total tetrablock copolymer weight.

Although S preferably means styrene, one may substitute other monovinylidene aromatic monomers for all or part of styrene without departing from this invention's spirit or scope. Such other monovinylidene aromatic monomers include those described in U.S. Pat. No. 4,666,987, U.S. Pat. No. 4,572,819, U.S. Pat. No. 4,585,825 and U.S. Pat. No. 5,721,320, the relevant teachings of which are incorporated herein by reference. Illustrative monovinylidene aromatic monomers include alpha-methylstyrene, para-methylstyrene, ortho-methylstyrene, para-tertiary butylstyrene, dimethyl styrene and vinyl naphthalene.

"Predominantly", as used herein to modify, styrene, butadiene and isoprene, means that a block, for example, styrene, contains a substantial fraction of styrene, preferably with no more than 1 wt percent of a monomer other than, in this case, styrene and more preferably with no monomer other than, in this case, styrene.

The styrenic tetrablock copolymer fraction of compositions of the present invention preferably contains no more than 15 wt percent, based upon tetrablock copolymer fraction weight, more preferably no more than 5 wt percent, still more preferably no more than 2 wt percent and even more preferably substantially no triblock polymers which, for purposes of this invention, constitute polymers that contain only one monovinylidene aromatic monomer block (S) and two distinct conjugated diene blocks (I and B). When present, such triblock copolymers, nominally S-I-B block copolymers or S-B-I block copolymers, adversely affect polymer blend composition physical properties relative to a polymer blend composition that is identical in every respect other than its lack of such triblock copolymers. For example, a S-I-B triblock copolymer content in excess of 5 wt percent leads to a lower ratio of stress at 200 percent strain to unload at 30 percent strain in elastomeric articles prepared from compositions of the present invention.

Sequential anionic polymerization in an inert organic solvent, as taught in U.S. Pat. No. 5,242,984 and U.S. Pat. No. 5,134,968, the relevant teachings of which are incorporated herein by reference, provides a preferred route to minimizing, more preferably eliminating, S-I-B triblock content. In simple terms, sequential anionic polymerization involves adding a first styrenic monomer, preferably styrene, to an anionic polymerization initiator, preferably an alkyllithium compound such as n-butyllithium, dispersed in an inert organic solvent and allowing polymerization of the first monomer to proceed substantially to completion before adding a first diene monomer, either I or B, and allowing polymerization to once again proceed substantially to completion, followed in turn by polymerization to substantial completion of a second diene monomer that is different from the first diene monomer, for example, B if the first diene monomer is I, and then by a second addition of a styrenic monomer, which may be the same as, or different than, the first styrenic monomer. After allowing styrene monomer added via the second addition to proceed to a desired level of polymerization, preferably to substantially complete polymerization, terminate further polymerization by adding a proton donating agent, such as an alkanol, for example, ethanol or water.

Compositions of the present invention also comprise from 8 wt percent to 45 wt percent, more preferably from 8 wt percent to 30 wt percent, and still more preferably from 10 wt percent to 15 wt percent, in each case based upon total composition weight, of a thermoplastic resin that differs from the styrenic tetrablock copolymer. The thermoplastic resin is preferably at least one resin selected from polystyrene (especially polystyrene with a Mw in excess of 100,000 g/M such as PS 3900, commercially available from Nova Chemicals), high impact polystyrene (also known as "HIPS" or rubber-modified polystyrene), a styrene-isoprene copolymer, a styrene-butadiene copolymer, a styrenic block copolymer other than the styrenic tetrablock copolymer, preferably a styrenic block copolymer with a styrene content in excess of 65 wt percent, based upon block copolymer weight, and an olefin polymer resin, and most preferably polystyrene. Olefin polymer resins preferably include ethylene-based polymers and propylene-based polymers. Suitable ethylene-based polymers include high-pressure low density polyethylene, high density polyethylene, linear low density polyethylene, ultra-low density polyethylene, ethylene/alpha-olefin copolymers wherein the alpha-olefin contains from three to twenty carbon atoms and ethylene/alpha-olefin interpolymers (sometimes referred to as "olefin block copolymers" or "OBC"). Desirable propylene-based polymers include homopolymer polypropylene, propylene/alpha-olefin copolymers wherein the alpha-olefin contains two (2) or from four (4) to eight (8) carbon atoms.

USPAP 2006/0205874 (Uzee et al.), the relevant teachings of which are incorporated herein by reference, discloses suitable examples of styrenic block copolymers with a styrene content in excess of 65 wt percent. Illustrative commercially available styrenic block copolymers with such a styrene content include those supplied by Chevron Phillips Chemical and designated as "K-Resin".

WO 2005/090427 (Arriola et al.), the relevant teachings of which are incorporated herein, provides that desirable olefin block copolymers include ethylene/alpha-olefin copolymers that (a) have a molecular weight distribution (MWD or ratio of weight average molecular weight (Mw) to number average molecular weight (Mn) or Mw/Mn) of from 1.7 to 3.5, at least one melting point (Tm), in degrees Celsius or centigrade (° C.), and a density (d), in grams/cubic centimeter (g/cc), wherein numerical values of Tm and d correspond to a relationship such that Tm is greater than (>)−2002.9+4538.5(d)−2422.2(d)$_2$; or (b) have a MWD of from 1.7 to 3.5, and is characterized by a heat of fusion (ΔH), in joules per gram (J/g), and a delta quantity, (ΔT), in degrees Celsius, with ΔT being defined as a difference in temperature between a temperature corresponding to that differential scanning calorimetry (DSC) peak having greatest height and a temperature corresponding to that crystallization analysis fractionation (CRYSTAF) peak having greatest height, with numerical values for ΔT and ΔH having a relationship as follows:

ΔT>−0.1299(ΔH)+62.81 for ΔH greater than zero and up to and including 130 J/g,

ΔT≧48° C. for ΔH greater than 130 J/g, the CRYSTAF peak being determined when at least five (5) percent by weight of the interpolymer has an identifiable CRYSTAF peak or, if less than 5 percent of the polymer has an identifiable CRYSTAF peak, the CRYSTAF peak temperature is nominally 30° C.; or (c) is characterized by an elastic recovery (Re), in percent at 300 percent strain and 1 cycle measured with a compression-molded film of the ethylene/α-olefin interpolymer, and has a density (d), in g/cc, wherein numerical values of Re and d satisfy a relationship of Re being >1481-1629(d) when the interpolymer is substantially free of a cross-linked phase; or (d) has a molecular fraction that elutes between 40° C. and 130° C. when fractionated using temperature rising elution fractionation (TREF), characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole interpolymer) within 10 percent of that of the OBC; or (e) has a storage modulus at 25° C., (G'(25° C.)), and a storage modulus at 100° C., (G'(100° C.)), wherein a ratio of G'(25° C.) to G'(100° C.) lies within a range of from 1:1 to 9:1.

The ethylene/α-olefin interpolymer or OBC may also:

(a) have a molecular fraction that elutes between 40° C. and 130° C. when fractionated using TREF, characterized in that the fraction has a block index of at least 0.5 and up to about 1 and a MWD greater than about 1.3; or (b) have an average block index greater than zero and up to about 1.0 and a MWD greater than about 1.3.

CRYSTAF determinations use a CRYSTAF 200 unit commercially available from PolymerChar, Valencia, Spain with test samples that are dissolved in 1,2,4-trichlorobenzene at 160° C. (0.66 mg/mL) for 1 hour (hr) and stabilized at 95° C. for 45 minutes. Sampling temperatures range from 95 to 30° C. with a cooling rate of 0.2° C./min. An infrared detector is used to measure the polymer solution concentrations. The cumulative soluble concentration is measured as the polymer crystallizes while temperature decreases. An analytical derivative of a cumulative profile reflects existence of short chain branching distribution of the polymer. The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Compositions of the present invention optionally comprise an extender material. As the extender material constitutes an optional component, it need not be present and, as such, a suitable lower limit for extender material is 0 wt percent. When present, a preferred lower limit is 1 wt percent, more preferably 2 wt percent, still more preferably 3 wt percent and most preferably 4 wt percent with a preferred upper limit of 20 wt percent, more preferably 18 wt percent, even more preferably 15 wt percent and still more preferably 10 wt percent, in each case based upon total composition weight.

Suitable extender materials include hydrocarbon oils, naphthenic oils, and polymers or oligomers derived from a monomer that has olefinic unsaturation and is compatible with at least one of isoprene and butadiene. Illustrative extender materials include SHELLFLEX™, CATENEX™ and ONDINA™ oils supplied by Royal Dutch/Shell, KAYDOL™ oils supplied by Witco, TUFFLO™ oils supplied by Arco and PRIMOL™ oils supplied by Exxon/Mobil and HYDROBRITE™ supplied by Crompton. Other suitable extender materials include compatible liquid tackifying resins such as REGALREZ™ R-1018 supplied by Eastman or ESCOREZ™ tackifying resins supplied by ExxonMobil. ESCOREZ™ and REGALREZ™ hydrocarbon resins are low molecular weight partially and fully hydrogenated water-white inert thermoplastic resins derived from petrochemical feedstocks. Still other suitable extender materials include liquid polymers with a Mw less than about 30,000 g/M such as liquid polybutene, liquid isoprene copolymers and liquid styrene/isoprene copolymers as well as vegetable oils, vegetable oil derivatives, paraffin and microcrystalline waxes. The extender material is preferably white mineral oil.

While not necessary, polymer blend compositions of the present invention may also include one or more conventional rubber compound additives, processing aids such as antioxidants and anti-ozanants, ultraviolet light stabilizers and heat stabilizers.

Illustrative antioxidants include both primary antioxidants, for example, a hindered phenol, and secondary antioxidants, for example, phosphite derivatives, or blends primary antioxidants, blends of secondary antioxidants or blends of both primary antioxidants and secondary antioxidants. Examples of commercially available antioxidants include 2,4-bis-(n-octylthio)-6-(4-hydroxy-3,5-di-tertiary-butylanilino)-1,3,5-triazine (IRGANOX™ 565, Ciba-Geigy), tetrakis-ethylene-(3,5-di-tertiary-butyl-4-hydroxy-hydrocinnamate)methane (IRGANOX™ 1010, Ciba-Geigy) and tris(2,4-di-tert-butylphenyl)phosphite (IRGAPHOS™168, Ciba-Geigy). Other suitable antioxidants include those developed to minimize butadiene segment degradation, for example, 2[1-(2-hydroxy-3,5-di-terpentylphenyl)ethyl)]-4,6-di-tert-pentylphenylacrylate (SUMILIZER™ GS, Sumitomo) and pentaerythrythyltetrakis(3-dodecylthiopropionate) (SUMILIZER™ T-PD, Sumitomo).

Polymer blend composition of the present invention may further include slip agents, such as those disclosed in U.S. Pat. No. 4,476,180 (Wnuk), the relevant teachings of which are incorporated herein by reference, especially those in column 4, lines 39-47. Conventional slip agents, often used in polymeric film fabrication, include those derived from an amide of a 12 to 22 carbon atom ($C_{12}$-$C_{22}$) fatty acid. Typical slip agent amounts range from 0.05 wt percent to 5 wt percent, preferably no more than 3 wt percent, in each case based upon total polymer blend composition weight.

As used herein, "predominantly" means substantially pure, for example, at least 95 wt percent homopolymer, more preferably at least 97 wt percent and still more preferably at least 99 wt percent, in each case based upon block weight.

Preparation of Film-Forming Polymer Blend Compositions of the Present Invention need not employ any particular apparatus or process. Conventional mixing apparatus, such as Banbury mixers, two roll mills and extruders, especially single screw and twin screw extruders, yield satisfactory results. Two or more blend composition components may, if desired, be pre-mixed or pre-compounded before addition to a mixing apparatus. An extender material, when used, may be added during tetrablock copolymer production or post-blended after such production or both. If added during tetrablock copolymer production, a favorable addition timing follows termination of polymerization and precedes tetrablock copolymer recovery and further processing, for example, pelletization and production in pellet, porous pellet, crumb or powder form.

Compositions of the present invention find utility in, among other end use applications, manufacture of both cast films and blown films, either as stand alone films or as a layer of a multi-layer film structure. Skilled artisans readily understand preparation of such films and apparatus, for example, extruders and dies, used to fabricate such films. Films, especially mono-layer or stand alone films, have a balance of physical properties that favors use personal hygiene applications.

The following examples illustrate, but do not limit, the present invention. All parts and percentages are based upon weight, unless otherwise stated. All temperatures are in ° C. Examples (Ex) of the present invention are designated by Arabic numerals and Comparative Examples (Comp Ex) are designated by capital alphabetic letters. Unless otherwise stated herein, "room temperature" and "ambient temperature" are nominally 25° C.

Polymer Preparation Techniques BCP-1 through BCP-4

A. BCP-1—Preparation of an elastomeric SIBS tetrablock copolymer representative of the present invention.

Add 13.67 kilograms (kg) of cyclohexane as an inert hydrocarbon solvent to a stirred 18.5 liter (L) reactor under a gaseous nitrogen ($N_2$) atmosphere and heat contents of the reactor to a set point temperature of 73° C. before adding, in order, 100.9 grams (g) of a 0.24 molar (M) solution of sec-butyllithium and 334 g of styrene monomer. Allow styrene monomer to polymerize in stage one for a period of 35 minutes, during which reactor contents temperature falls to 59° C., before adding 775.3 g of isoprene monomer. Allow isoprene polymerization in stage two to occur over a period of 29 minutes during which reactor contents reach a peak temperature of 76° C. before dropping back to 59° C., an indication that polymerization of isoprene monomer is substantially complete. Add 775.3 g of butadiene monomer and allow it to polymerize in stage three during which reactor contents reach a peak temperature of 76° C. before dropping back again to 59° C. to show substantial completion of butadiene polymerization. Add 334 g of styrene monomer and allow it to polymerize in stage four over a period of 35 minutes before quenching further polymerization by adding 3.5 m. of isopropanol to the reactor contents to yield raw SIBS tetrablock copolymer.

Neutralize reactor contents by adding phosphoric acid at a molar ratio of 0.8 mole of acid per mole of sec-butyllithium. Remove the polymer from the reactor and add, to the neutralized reactor contents, a phenolic antioxidant (IRGANOX™ 565) in an amount of 1250 parts by weight per million parts by weight (ppm) of SIBS tetrablock copolymer and a phosphite antioxidant (TNPP) in an amount of 2000 ppm of SIBS tetrablock copolymer, then remove reactor contents and subject them to devolatilization in a vacuum oven operating at a set point temperature of 100° C. for at least three hours to yield a stabilized and devolatilized SIBS tetrablock copolymer.

SEC analysis of the stabilized and devolatilized SIBS tetrablock copolymer reveals a single main peak with a number average molecular weight (Mn) of 98,121 on a polystyrene calibration basis and a peak weight average molecular weight of 101,640 on a polystyrene calibration basis. The SIBS tetrablock copolymer has a nominal styrene content of 29.9 wt percent, based upon total tetrablock weight, with a butadiene to isoprene weight ratio of 50:50. The molecular weight of the styrene block is estimate based on the overall percent styrene and the corrected weight average molecular weight of the polymer.

B. BCP-2—Preparation of a Linear SIB Triblock Copolymer.

Replicate BCP-1 with several changes. First, reduce the amount of cyclohexane to 13.6 kg, increase amounts of sec-butyllithium solution and styrene monomer, respectively, to 195 g and 663.9 g and reduce stage one polymerization time to 24 minutes. Second, change the amount of isoprene monomer to 774.6 g and allow polymerization to continue for 23 minutes in stage two and the reactor contents to reach a temperature of 69° C. before adding 774.6 g of butadiene monomer to the reactor contents to start stage three which results in a peak temperature of 84.2° C. Omit stage four, thereby yielding a raw SIB triblock copolymer.

SEC analysis shows a single main peak with a Mn of 50,745 and a peak maximum weight average molecular weight of 51,840. The SIB triblock copolymer has a nominal styrene content of 28.2 wt percent, based upon total triblock weight, with a butadiene to isoprene weight ratio of 50:50. The molecular weight of the styrene block is estimate based on the overall percent styrene and the corrected weight average molecular weight of the polymer C. BCP-3—Preparation of a Linear S(I/B)S Triblock Copolymer with a Random I/B Block.

Replicate BCP-1 with several changes. First reduce the amount of cyclohexane to 13.54 kg and change the amounts of sec-butyllithium and styrene monomer to, respectively, 101.3 g and 336.1 g for stage one polymerization which lasts for 22 minutes rather than 35 minutes as in BCP-1 such that temperature in stage one reaches 69° C. Add 1532 g of a 50/50 weight mixture of isoprene and butadiene and allow it to polymerize in stage two (effectively a combination of stages two and three in BCP-1) over a period of 29 minutes during which time reactor contents reach a peak temperature of 98.6° C. Add 336.1 g styrene monomer in a third polymerization stage (effectively equivalent to stage four in BCP-1) that lasts for 30 minutes rather than 35 minutes as in BCP-1 and yields a raw S(I/B)S triblock copolymer.

Neutralize and stabilize the raw copolymer as in BCP-1, but reduce the phenolic antioxidant to 1000 ppm and increase the phosphite antioxidant to 5000 ppm.

SEC analysis shows a single main peak with a Mn of 94,004 and a peak maximum weight average molecular weight of 96,377. SEC analysis also shows the polymer to be an elastomeric S-(I/B)-S triblock copolymer that has a nominal styrene content of 30.8 wt percent, based upon total triblock weight, with a butadiene to isoprene weight ratio of 50:50. The molecular weight of the styrene block is estimate based on the overall percent styrene and the corrected weight average molecular weight of the polymer D. BCP-4—Preparation of a Linear S-(I/B) Diblock Copolymer with a Random I/B Block Replicate BCP-3 with several changes to provide two polymerization stages. First, reduce cyclohexane addition to 13.6 kg as in BCP-2, increase sec-butyllithium solution addition to 189.9 g, increase styrene monomer addition to 670.9 g and allow polymerization to proceed for 58 minutes. Second, at a reactor contents temperature of 69° C., add 1543 g of the 50/50 weight mixture of isoprene and butadiene and allow polymerization to proceed through a peak temperature of 80.6° C. and yield a raw S-(I/B) diblock copolymer.

SEC analysis shows a single main peak with a Mn of 49,917 and a peak maximum weight average molecular weight of 50,660. The S-(I/B) diblock copolymer has a nominal styrene content of 29.2 wt percent, based upon total triblock weight, with a butadiene to isoprene weight ratio of 50:50. The molecular weight of the styrene block is estimate based on the overall percent styrene and the corrected weight average molecular weight of the polymer Additional Tetrablock Copolymer Preparation Replicate BCP-1 but change relative proportions of styrene, isoprene and butadiene to prepare eight SIBS tetrablock copolymers, nominally SIBS-1 through SIBS-8, having corrected weight average molecular weights, styrene end block molecular weights and weight percentages of styrene in the SIBS tetrablock copolymer and relative weight percentages of I to B in a non-styrenic, mid-block portion of the SIBS tetrablock copolymer, all as shown in Table 1 below.

TABLE 1

| Tetrablock Copolymer Identification | Corrected Weight Average Molecular Weight (Mw), (g/M) | Styrene End-block, Mw | Wt. Percent Styrene | Wt. Percent Isoprene | Wt. Percent Butadiene |
|---|---|---|---|---|---|
| SIBS-1 | 101,920 | 10,190 | 20.0 | 29 | 71 |
| SIBS-2 | 107,153 | 11,689 | 21.4 | 35 | 65 |
| SIBS-3 | 106,818 | 12,763 | 23.5 | 35 | 65 |
| SIBS-4 | 107,341 | 14,288 | 26.1 | 35 | 65 |
| SIBS-5 | 104,240 | 14,620 | 28.1 | 35 | 65 |
| SIBS-6 | 78,920 | 11,548 | 29.4 | 31 | 69 |
| SIBS-7 | 96,000 | 10,944 | 22.8 | 50 | 50 |
| SIBS-8 | 102,119 | 11,130 | 21.8 | 35 | 65 |

Table 2 below lists a number of materials that may be used in conjunction with a styrenic tetrablock copolymer to make a film-forming polymer blend composition of the present invention.

TABLE 2

| Ingredient Designation | Product Description |
|---|---|
| PS | Homopolymer polystyrene (PS 3900, Nova Chemicals) |
| LDPE | Low Density Polyethylene (LDPE 6411, The Dow Chemical Company) |
| MO-200 | Paraffinic white mineral oil (MO-200, Witco) |
| MO-325 | Paraffinic white mineral oil (PRIMOL ™ 325, Exxon/Mobil) |
| AO | 2,4-bis-(n-octylthio)-6-(4-hydroxy-3,5-di-tertiary-butylanilino)-1,3,5-triazine (IRGANOX ™ 565, Ciba-Geigy) |
| h(SIS) | Styrene-Isoprene-Styrene Triblock Copolymer (a developmental SIS triblock copolymer with a styrene content of 86 wt percent, based on copolymer weight, and a weight average molecular weight of 96,000 grams per mole, Dexco Polymers LP) |
| SIS-1 | SIS triblock copolymer (VECTOR ™ 4211, a linear SIS triblock copolymer with a styrene content of 30 wt percent, based upon copolymer weight, and a weight average molecular weight of 96,000 grams per mole, Dexco Polymers LP) |
| SBS-1 | SBS triblock copolymer (VECTOR ™ 8508, a linear SBS triblock copolymer with a styrene content of 29 wt percent, based upon copolymer weight, and a weight average molecular weight of 73,000 grams per mole, Dexco Polymers LP) |

Test Methods

A. Tensile Strength and Elongation at Failure

Place a 50 gram (g) aliquot of the polymer or polymer compound on a heated two roll mill. Two roll mill processing fuses the polymer or polymer compound into a fused sheet or blanket that has a machine direction (MD) normal to axes of the rolls and a transverse direction (TD) parallel to axes of the rolls orientation. Maintain identification of the MD and TD through compression molding and testing (for example, blanket MD is the same as test plaque MD). Use a PHI hydraulic press operating at a set point temperature of 200° C. and convert 7.5 g of the fused sheet or blanket into test plaques (approximately 65 mm wide×115 mm long×0.94 mm thick). Using an American Society for Testing and Materials (ASTM) D1822 Type L die with 1.28 centimeter (cm) tabs, cut sample specimens from the molded plaques such that longitudinal orientation of the specimens is parallel to plaque TD. Determine tensile stress-strain properties of the sample specimens according to ASTM Method D412-87 and report results as an average of three samples.

"Tensile strength", also referred to as "tensile stress", in megapascals (MPa), represents a ratio of F to A, where F equals an observed force at a specified elongation of a test specimen and A equals cross-sectional area of a test specimen prior to elongation.

"Elongation percentage" or "% E" equals $100(L-LO)/LO$ where L equals observed distance in centimeters (cm) between bench marks on a stretched or elongated test specimen and LO equals distance in cm between the bench marks of a test specimen prior to stretching or elongation.

"Unload Force", also known as "force at unload", in MPa, equals a quotient of F' divided by A, where F' is an observed force at a specified elongation during return of a stretched or elongated test specimen to a relaxed (0 percent elongation) state during a first cycle of hysteresis testing and A is as defined above.

B. Hardness Test

Determine Shore A Durometer hardness according to ASTM D 2240 using a Model 716A Durometer Hardness System available from Shore Instruments. Using a PHI hydraulic press operating at a set point temperature of 200° C., convert 14 g of the fused sheet or blanket prepared in Test Method A (discussed above) into test circular test plaques (approximately 75 mm in diameter and 3.175 mm thick). Stack two 3.175 mm thick compression molded sample plaques prior to thickness testing.

C. Melt Flow Rate

Determine composition or polymer melt flow rate (MFR) in accord with ASTM D-1238, at 200° C. with a 5 kg weight using a standard die with a 2.0955 mm diameter hole (formerly known as Condition "G").

D. Hysteresis or Stress Relaxation Test

Measure hysteresis properties at room temperature (nominally 23° C.) using test sample specimens prepared as in Test Method A above and a test protocol as follows:
1. (1) calibrate an INSTRON™ Model 1122 tensometer according to the manufacturer's instructions;
2. (2) set instrument gauge length at 1" (2.54 cm) and place the test sample specimen in the instrument according to the manufacturer's instructions
3. (3) set instrument cross head speed at a constant speed of 10 inches per minute (0.254 meter per minute);
4. (4) pre-strain the test sample specimen to 500 percent elongation, then return (without hold time or elapsed time at 500 percent elongation) the sample to 0 percent elongation and record measured peak force at 500 percent elongation;
5. (5) rest the sample for 120 seconds;
6. (6) re-clamp the pre-strained test sample specimen to remove any slack in the specimen and maintain a 1" (2.54 cm) gauge length;
7. (7) start hysteresis testing and collect the data as follows:
    a) stretch the test sample specimen to 200 percent elongation at a rate of 10 inches per minute (0.254 per minute) and record both the stress and peak force at 200 percent elongation;
    b) hold the stretched test specimen at 200 percent elongation position for 30 seconds, record stress after the 30 second hold and calculate a value for relaxation at 200 percent elongation as percent of stress loss between 7a) and 7b); and
    c) return the stretched test specimen to 0 percent elongation at a rate of 10 inches per minute (0.254 meters per minute), determining and recording unload stress at 30 percent elongation during the return to 0 percent elongation.

Each reported or recorded result represents an average of results from three test sample specimens.

Ex 1 and Comp Ex A

Convert 50 g of polymer (BCP-1 for Ex 1 and BCP-3 for Comp Ex A) to a fused sheet having a thickness of approximately five (5) mm by processing the polymer on a pre-heated Lab Tech Engineering laboratory scale two-roll mill, Type LRM-S-110-3E, operating with a roll temperature of 155° C., for a period of approximately 90 seconds. Remove the fused sheet from the two-roll mill, noting both MD and TD of the fused sheet, evenly distribute 7 to 7.5 g of the fused sheet between a polytetrafluoroethylene (PTFE) coated glass sheet and a metal backing plate, both of which are disposed in a 75 mm wide by 115 mm high by 0.94 mm thick chase of a pre-heated (to 200° C.) molding press (PHI Model SB234C-X-MS-X24) and convert the fused sheet to a molded plaque or sheet having a thickness of approximately 0.94 mm using a molding protocol. The molding protocol is as follows: pre-heat 3.0 minutes at zero pressure; apply pressure (10,000 kilogram (kg) ram force) for a period of 0.5 minute; increase pressure to 20,000 kg ram force and maintain that pressure for a period of 3.0 minutes; maintain the 20,000 kg ram force applied pressure for an additional period of 4.5 minutes to cool the molded plaque to a temperature suitable for plaque handling using ambient temperature (nominally 23° C.) water cooling; remove the cooled, molded plaque from the molding press and store the plaque for a period of at least 24 hours at 23° C., before die-cutting test sample specimens from the plaque using an ASTM-D 1822 Die L for tensile and hysteresis testing. The test sample specimens have an initial gauge length of 25.4 mm.

Subject three test sample specimens for each of Ex 1 and Comp Ex A to MD tensile testing and three additional test sample specimens for each of Ex 1 and Comp Ex A to TD hysteresis testing, and summarize test results (an average of test results for three specimens) in Table 3 below.

Ex 2 and Comp Ex B

Replicate Ex 1, but change the polymer for each of Ex 2 and Comp Ex B. Ex 2 is a blend of 85 wt percent BCP-1 and 15 wt percent BCP-2, each wt percent being based on blend weight. Comp Ex B is a blend of 85 wt percent BCP-3 and 15 wt percent BCP-4, each wt percent being based on blend weight. Table 3 below summarizes test results.

Comp Ex C

Replicate Ex 1 with changes. Place 5 g of PS (Table 2), 42.5 g of BCP-3, 2.5 g of MO-325 (Table 2) and 0.5 liter of toluene into a 0.9472 liter jar, then seal the jar and place it on a shaker for a period of 24 hours to allow polymeric components to go into solution. Place the solution in a devolatilizing oven to remove the toluene and recover a polymer blend. Process 45 g of the polymer blend as in Ex 1 and record average test results in Table 3 below.

Comp Ex D

Replicate Comp Ex C with changes in the polymer blend to reduce the amount of BCP-3 to 36.125 g and add 6.375 g of BCP-4. Record average test results in Table 3 below.

Ex 3

Replicate Comp Ex C, but substitute BCP-1 for BCP-3. Record average test results in Table 4 below.

Ex 4

Replicate Comp Ex D, but substitute BCP-1 for BCP-3 and BCP-2 for BCP-4. Record average test results in Table 4 below.

Ex 5

Replicate Ex 3, but substitute 5 g of LDPE (Table 2) for 5 g of PS. Since LDPE is not soluble in toluene, add the LDPE to the shaken polymer solution just prior to placement of the solution in the devolatilizing oven. Record average test results in Table 4 below.

Comp Ex E

Replicate Comp Ex D, but substitute 5.0 g of LDPE (Table 2) for 5.0 g of PS. Add the LDPE to the shaken polymer solution just prior to placement of the solution in the devolatilizing oven. Record average test results in Table 4 below.

Ex 6

Replicate Comp Ex C, but substitute 42.5 g of BCP-1 for the BCP-3 and 2.5 g of LDPE for 2.5 g of PS. Add the LDPE as described in Comp Ex G. Record average test results in Table 4 below.

Comp Ex F

Replicate Comp Ex C, but substitute 2.5 g of LDPE for 2.5 g of PS. Add the LDPE as described in Comp Ex E. Record average test results in Table 4 below.

Ex 7-12

Replicate Ex 1 but substitute SIBS-1 through SIBS-6 (Table 1) for BCP-1 in, respectively, Ex 7-12. Record average test results in Table 5 below.

Comp Ex G

Replicate Ex 1 but substitute 15.5 g of SIS-1 (Table 2) and 34.5 g of SBS-1 (Table 2) for BCP-1. Record average test results in Table 6 below.

Ex 13

Replicate Ex 1, but substitute SIBS-7 for BCP-1. Record average test results in Table 6 below.

Ex 14

Replicate Ex 3, but substitute SIBS-8 for BCP-1 and MO-200 (Table 2) for MO-325. Record average test results in Table 6 below.

Ex 15

Replicate Ex 14, but substitute five (5) g of h(SIS) (Table 2) for the 5 g of PS. Record average test results in Table 6 below.

TABLE 3

|  |  | \multicolumn{6}{c|}{Ex/Comp Ex ID No.} |
| --- | --- | --- | --- | --- | --- | --- | --- |
|  |  | 1 | A | 2 | B | C | D |
| BCP-1 | Wt % | 100 |  | 85 |  |  |  |
| BCP-3 | Wt % |  | 100 |  | 85 | 85 | 72.25 |
| BCP-2 | Wt % |  |  | 15 |  |  |  |
| BCP-4 | Wt % |  |  |  | 15 |  | 12.75 |
| PS | Wt % |  |  |  |  | 10 | 10 |
| MO-325 | Wt % |  |  |  |  | 5 | 5 |
| Total, Wt. % |  | 100 | 100 | 100 | 100 | 100 | 100 |
| Styrene Content of block polymer(s) | Wt %. | 29.9 | 30.8 | 29.7 | 30.6 | 30.8 | 30.6 |
| Melt Flow Rate, | dg/min. | 51 | 56 | 84 | 86 | 82 | 125 |
| Hardness | Shore A | 61.4 | 59 | 58.1 | 55.8 | 57.9 | 54.7 |
| Tensile Testing (MD) |  |  |  |  |  |  |  |
| Ultimate Tensile Strength | MPa | 4.21 | 5.70 | 8.83 | 4.92 | 4.31 | 2.99 |
| 300% Modulus | MPa | 3.80 | 4.35 | 2.94 | 2.96 | 3.96 | 2.32 |
| 150% Modulus | MPa | 2.74 | 3.48 | 2.09 | 2.08 | 2.94 | 1.63 |
| Elongation | % | 1025 | 825 | 975 | 831 | 519 | 631 |
| Hysteresis Testing (TD) |  |  |  |  |  |  |  |
| Peak Force @ 500% Elongation | MPa | 4.43 | 4.44 | 3.30 | 3.70 | 4.39 | 2.81 |
| Peak Force @ 200% Elongation | MPa | 1.54 | 1.31 | 1.23 | 1.04 | 1.10 | 0.89 |
| Relaxation @ 200% Elongation | percent | 6.9 | 9.0 | 7.5 | 10.7 | 11.1 | 11.5 |
| Unload @ 30% Elongation | MPa | 0.38 | 0.22 | 0.28 | 0.14 | 0.15 | 0.12 |
| Ratio of Load @ 200% to Unload @ 30% | Ratio | 4.1 | 5.9 | 4.4 | 7.1 | 7.2* | 7.3 |

*Specimen broke prematurely due to low elongation

TABLE 4

| | | \multicolumn{6}{c}{Ex/Comp Ex ID No.} | | | | | |
|---|---|---|---|---|---|---|---|
| | | 3 | 4 | 5 | E | 6 | F |
| BCP-1 | Wt % | 85 | 72.25 | 85 | | 85 | |
| BCP-3 | Wt % | | | | 72.25 | | 72.25 |
| BCP-2 | Wt % | | 12.75 | | | | |
| BCP-4 | Wt % | | | | 12.75 | | 12.75 |
| PS | Wt % | 10 | 10 | | | 5 | 5 |
| LDPE | Wt % | | | 10 | 10 | 5 | 5 |
| MO-325 | Wt % | 5 | 5 | 5 | 5 | 5 | 5 |
| Total, Wt. % | | 100 | 100 | 100 | 100 | 100 | 100 |
| Styrene Content of block polymer(s) | Wt %. | 29.9 | 29.7 | 29.9 | 30.6 | 30.8 | 30.6 |
| Melt Flow Rate, g/10 min. | dg/min. | 75 | 114 | 61 | 101 | 67 | 112 |
| Shore A Hardness | Shore A | 59.7 | 55.3 | 60.0 | 55.3 | 59.9 | 54.4 |
| Tensile Testing (MD) | | | | | | | |
| Ultimate Tensile Strength | MPa | 7.49 | 5.41 | 6.37 | 3.34 | 6.59 | 3.02 |
| 300% Modulus | MPa | 3.07 | 2.48 | 3.79 | 2.97 | 3.41 | 2.50 |
| 150% Modulus | MPa | 1.97 | 1.59 | 2.74 | 2.35 | 2.36 | 1.79 |
| Elongation | % | 825 | 800 | 819 | 538 | 806 | 650 |
| Hysteresis Testing (TD) | | | | | | | |
| Peak Force @ 500% Elongation | MPa | 4.27 | 3.39 | 4.16 | 2.59 | 4.32 | 2.63 |
| Peak Force @ 200% Elongation | MPa | 1.43 | 1.12 | 1.32 | 1.73 | 1.40 | 0.90 |
| Relaxation @ 200% Elongation | percent | 8.5 | 9.6 | 8.6 | 11.6 | 8.5 | 10.7 |
| Unload @ 30% Elongation | MPa | 0.32 | 0.21 | 0.26 | 0.11 | 0.28 | 0.13 |
| Ratio of Load @ 200% to Unload @ 30% | Ratio | 4.4 | 5.4 | 5.0 | 7.4 | 4.9 | 7.0 |

TABLE 5

| | | \multicolumn{6}{c}{Example No.} | | | | | |
|---|---|---|---|---|---|---|---|
| Type | | 7 SIBS-1 | 8 SIBS-2 | 9 SIBS-3 | 10 SIBS-4 | 11 SIBS-5 | 12 SIBS-6 |
| Styrene Content | Wt % | 20.0 | 21.4 | 23.5 | 26.1 | 28.1 | 29.4 |
| Melt Flow Rate | dg/min. | 5.4 | 3.4 | 2.2 | 1.6 | 1.5 | 11.6 |
| Hardness | Shore A | 58.3 | 56.9 | 61.1 | 64.9 | 67.4 | 62.8 |
| Tensile Testing (TD) | | | | | | | |
| Ultimate Tensile Strength | MPa | 21.55 | 20.44 | 27.93 | 29.33 | 30.24 | 31.70 |
| 300% Modulus | MPa | 2.39 | 2.45 | 2.81 | 3.11 | 3.08 | 3.85 |
| 150% Modulus | MPa | 1.75 | 1.81 | 1.99 | 2.19 | 2.20 | 2.65 |
| Elongation | % | 1144 | 1244 | 842 | 831 | 831 | 925 |
| Hysteresis Testing (TD) | | | | | | | |
| Peak Force @ 500% Elongation | MPa | 3.50 | 3.74 | 4.57 | 4.97 | 6.35 | 6.21 |
| Peak Force @ 200% Elongation | MPa | 1.58 | 1.44 | 1.65 | 1.70 | 1.82 | 1.83 |
| Relaxation @ 200% Elongation | % | 4.9 | 5.4 | 4.2 | 3.8 | 4.6 | 6.1 |
| Unload @ 30% Elongation | MPa | 0.39 | 0.33 | 0.51 | 0.58 | 0.56 | 0.50 |
| Ratio of Load @ 200% to Unload @ 30% | Ratio | 4.1 | 4.4 | 3.2 | 2.9 | 3.3 | 3.6 |

TABLE 6

| | | \multicolumn{4}{c}{Ex/Comp Ex ID No.} | | | |
|---|---|---|---|---|---|
| | | G | 13 | 14 | 15 |
| SIS-1 | Wt % | 31 | | | |
| SBS-1 | Wt % | 69 | | | |
| SIBS-7 | Wt % | | 100 | | |
| SIBS-8 | Wt % | | | 85 | 85 |
| PS | Wt % | | | 10 | |
| h(SIS) | Wt % | | | | 10 |
| MO-200 | Wt % | | | 5 | 5 |
| Styrene Content of block polymer(s) | Wt % | 29.3 | 22.8 | 21.8 | 21.8 |
| Melt Flow Rate | dg/min. | 14.9 | 5.4 | 8.3 | 7.3 |
| Hardness | Shore A | 61.9 | 58.1 | 47.6 | 50.7 |
| Tensile Testing* | | | | | |
| Ultimate Tensile Strength | MPa | 30.52 | 17.41 | 12.43 | 12.39 |
| 300% Modulus | MPa | 3.74 | 3.20 | 2.17 | 2.23 |
| 150% Modulus | MPa | 2.60 | 2.20 | 1.43 | 1.49 |
| Elongation | % | 1113 | 1206 | 1013 | 1094 |

TABLE 6-continued

| | | Ex/Comp Ex ID No. | | | |
|---|---|---|---|---|---|
| | | G | 13 | 14 | 15 |
| Hysteresis Testing* | | | | | |
| Peak Force @ 500% Elongation | MPa | 5.79 | 4.15 | 3.35 | 3.44 |
| Peak Force @ 200% Elongation | MPa | 1.72 | 1.49 | 1.38 | 1.43 |
| Relaxation @ 200% Elongation | % | 7.2 | 4.9 | 5.3 | 5.2 |
| Unload @ 30% Elongation | MPa | 0.39 | 0.383 | 0.31 | 0.33 |
| Ratio of Load @ 200% to Unload @ 30% | Ratio | 4.4 | 3.9 | 4.4 | 4.3 |

*tested in the transverse direction

The data presented in Table 3 above support several observations. First, a comparison of Ex 1 and Comp Ex A shows that tetrablock copolymers of the present invention (Ex 1), wherein I and B exist as substantially distinct blocks, provide an improved hysteresis performance (for example, a lower ratio of load at 200 percent elongation to unload at 30 percent elongation) relative to triblock copolymers (Comp Ex A) wherein I and B exist as components of a random block (S-(I/B)-S). Dilution of a tetrablock copolymer representative of the present invention with up to 15 wt percent of a linear triblock (S-I-B) as in Ex 2 provides some decrease in hysteresis performance, as evidenced by an increase in the ratio of load at 200 percent elongation to unload at 30 percent elongation from 4.1 to 4.4, still yields better hysteresis performance than Comp Ex A. Diluting triblock copolymers that have a random I/B block with random diblock S(I/B), further reduces hysteresis performance as shown in Comp Ex B versus Comp Ex A, and Comp Ex D (which also includes PS and MO-325 oil) versus Comp Ex B. Table 4 contains additional data that supports improved hysteresis performance of tetrablock copolymers of the present invention relative to triblock copolymers with a random I/B block. See, for example, Ex 3 versus Comp Ex C and Ex 4 versus Comp Ex F.

The data in Tables 5 and 6 show that one may vary styrene content in tetrablock copolymers of the present invention to achieve a range of melt flow rates, Shore A hardness values, tensile test properties while maintaining, or even improving hysteresis performance relative to Ex 1. Skilled artisans recognize that hysteresis performance improves as the ratio of load at 200 percent elongation to unload at 30 percent elongation decreases. A comparison of Ex 12 with Comp Ex G, which have similar styrene contents (29.3 wt percent for Comp Ex G versus 29.2 wt percent for Ex 12) shows that a single S-I-B-S tetrablock copolymer of the present invention has a better hysteresis performance than a blend of a SIS block copolymer with a SBS block copolymer.

What is claimed is:

1. A polymer blend composition, the composition comprising components:
   a) from 55 percent by weight to 92 percent by weight, based upon composition weight, of a styrenic tetrablock copolymer, the tetrablock copolymer having (1) a molecular structure represented as S-I-B-S, wherein each S is independently a polymer block of predominantly styrene and has an apparent molecular weight within a range of from 10,000 to 15,000, I is a polymer block of predominantly isoprene and B is a polymer block of predominantly butadiene, I and B being present in a weight ratio of I:B that falls within a range of from 75:25 to 15:85, (2) a polymerized styrene content within a range of from 15 percent by weight to 32 percent by weight, based upon tetrablock copolymer weight, and (3) an apparent molecular weight within a range of from 85,000 to 160,000;
   b) from 8 percent by weight to 45 percent by weight, based upon composition weight, of a thermoplastic resin that differs from component (a); and, optionally,
   c) from 0 percent by weight to 20 percent by weight, based upon composition weight, of an extender material, amounts of a), b) and c), when taken together, totaling 100 percent by weight.

2. The composition of claim 1, wherein the thermoplastic resin (b) is at least one resin selected from polystyrene, a styrene-isoprene copolymer, a styrene-butadiene copolymer, and an olefin polymer resin.

3. The composition of claim 2, wherein the thermoplastic resin is a styrene-isoprene copolymer or a styrene-butadiene copolymer, in either case having a polymerized styrene content of more than 65 percent by weight, based upon copolymer weight.

4. The composition of claim 2, wherein the thermoplastic resin is an olefin polymer resin selected from ethylene-based polymers and propylene-based polymers.

5. The composition of claim 4, wherein the thermoplastic resin is an ethylene-based polymer selected from high-pressure low density polyethylene, high density polyethylene, linear low density polyethylene, ultra-low density polyethylene, ethylene/alpha-olefin copolymers wherein the alpha-olefin contains from three to twenty carbon atoms and ethylene/alpha-olefin interpolymers.

6. The composition of claim 4, wherein the thermoplastic resin is a propylene-based polymer selected from homopolymer polypropylene, propylene/alpha-olefin copolymers wherein the alpha-olefin contains two or from four to eight carbon atoms.

7. The composition of claim 1, wherein the extender is selected from hydrocarbon oils, naphthenic oils, and polymers or oligomers derived from a monomer that has olefinic unsaturation compatible with at least one of isoprene and butadiene.

8. The composition of claim 7, wherein the hydrocarbon oil is white mineral oil.

9. The composition of claim 7, wherein the extender is present in an amount of from 1 percent by weight to 18 percent by weight, based upon composition weight.

10. The composition of claim 1, wherein the styrenic tetrablock copolymer is present in an amount within a range of from 65 percent by weight to 92 percent by weight, based upon composition weight.

11. The composition of claim 1, wherein the thermoplastic resin b) is present in an amount within a range of from 8 percent by weight to 30 percent by weight, based upon composition weight.

12. The composition of claim 1, wherein the extender material c) is present in an amount within a range of from greater than 0 percent by weight to 15 percent by weight, based upon composition weight.

13. A polymeric film comprising at least one layer prepared from the composition of any of claims 1 through 12.

14. The polymeric film of claim 13, wherein the layer has a transverse hysteresis testing ratio of peak force at 200 percent elongation to unload at 30 percent elongation that is less than that of a layer prepared from a composition same type and amount of thermoplastic resin and extender, but with a styrenic block copolymer having the same styrene, isoprene and butadiene contents, the isoprene and butadiene being present as a substantially random polymer block.

15. The polymeric film of claim 13, wherein the transverse hysteresis testing ratio is less than or equal to 5 for a layer composition comprising 85 percent by weight of tetrablock having a styrene content of about 30 percent by weight, an isoprene content of about 35 percent by weight and a butadiene content of about 35 percent by weight, each tetrablock percent by weight being based upon tetrablock weight, 10 percent by weight of polystyrene and 5 percent by weight of white mineral oil as the extender, the percents by weight of tetrablock, low density polyethylene and mineral oil being based upon composition weight.

* * * * *